United States Patent
Kahlenbach

(10) Patent No.: US 12,104,923 B2
(45) Date of Patent: Oct. 1, 2024

(54) EXCHANGE OF DATA BETWEEN A NAVIGATION DEVICE AND A DATA CLOUD FOR A ROUTE

(71) Applicant: Joynext GmbH, Dresden (DE)

(72) Inventor: Andreas Kahlenbach, Dresden (DE)

(73) Assignee: JOYNEXT GmbH, Dresden (DE)

( * ) Notice: Subject to any disclaimer, the term of this patent is extended or adjusted under 35 U.S.C. 154(b) by 181 days.

(21) Appl. No.: 17/988,839

(22) Filed: Nov. 17, 2022

(65) Prior Publication Data

US 2023/0194308 A1    Jun. 22, 2023

(30) Foreign Application Priority Data

Dec. 16, 2021  (DE) .......................... 102021133435.7

(51) Int. Cl.
- *G01C 21/00* (2006.01)
- *G01C 21/34* (2006.01)
- *G01C 21/36* (2006.01)

(52) U.S. Cl.
CPC ..... *G01C 21/3896* (2020.08); *G01C 21/3469* (2013.01); *G01C 21/3691* (2013.01); *G01C 21/3889* (2020.08)

(58) Field of Classification Search
CPC ............ G01C 21/3896; G01C 21/3469; G01C 21/3691; G01C 21/3889
See application file for complete search history.

(56) References Cited

U.S. PATENT DOCUMENTS

| | | | | |
|---|---|---|---|---|
| 8,494,764 B2* | 7/2013 | Lappe | ............... | G01C 21/28 701/422 |
| 9,200,914 B2* | 12/2015 | Solomon | ................ | G01C 21/34 |
| 9,510,265 B2* | 11/2016 | Bodin | ................ | H04W 40/20 |
| 11,012,502 B2* | 5/2021 | Schmitz | ................ | H04L 67/55 |
| 11,267,460 B2* | 3/2022 | Sugano | ............... | B62D 15/0285 |
| 2016/0044571 A1* | 2/2016 | Choi | ................ | H04W 8/085 370/235 |
| 2020/0263993 A1* | 8/2020 | Gaal | ................ | G01C 21/3878 |
| 2023/0194308 A1* | 6/2023 | Kahlenbach | ....... | G01C 21/3896 701/423 |
| 2024/0067214 A1* | 2/2024 | Nagasaka | .......... | G01C 21/3492 |

FOREIGN PATENT DOCUMENTS

DE    102019009057 A1    6/2021

OTHER PUBLICATIONS

Examination Report in DE 102021133435.7 dated Aug. 11, 2022.

\* cited by examiner

*Primary Examiner* — Frederick M Brushaber
(74) *Attorney, Agent, or Firm* — Manelli Selter PLLC; Edward Stemberger

(57) ABSTRACT

The invention relates to a method for exchanging data between a navigation device and a data cloud regarding a route (300). The method includes the steps of: storing the route (300) in the data cloud and in the navigation device, assigning a route identifier for the route (300) in the data cloud, transferring the route identifier from the data cloud to the navigation device, and transmitting additional data between the navigation device and the data cloud, each of which is related to a route segment (305) of the route (300) and is transmitted together with the route identifier.

10 Claims, 2 Drawing Sheets

EXCHANGE OF DATA BETWEEN A NAVIGATION DEVICE AND A DATA CLOUD FOR A ROUTE The invention relates to a method for exchanging data between a navigation device and a data cloud about a route.

BACKGROUND

A route is understood to be a path from a starting position to a destination position that is described by waypoints of the path that follow one another or are linked to one another in a defined sequence. A navigation device is used here to refer to a device with a navigation function, even if the device has other functions. For example, a smartphone with a navigation function is also a navigation device according to this definition.

A route is often calculated using a route planner. A route planner is a computer program that is executed, for example, by a navigation device or in a data cloud. The target position of a route is usually derived from a destination specified by a user of the route planner. Alternatively, the target position can also be estimated, for example based on routes traveled by the user in the past. The start position may also be derived from a target specified by the user. Alternatively, the start position may be, for example, a current position of the user. The user's position is usually determined using a navigation satellite system, for example using GPS, GLONASS, Beidou or Galileo.

SUMMARY

The invention relates to communication between a navigation device and a data cloud. Such communication may, for example, be used to communicate data from the data cloud to the navigation device that is relevant to traveling a route. Such data relate to, for example, anticipated weather conditions or traffic conditions along the route, an anticipated energy consumption, or an anticipated time duration for traveling the route or a route segment of the route. For example, the communication between the navigation device and the data cloud could be such that such data can be retrieved by the navigation device by sending a request from the data cloud.

Accordingly, data from the navigation device can also be transmitted to the data cloud. Such data relate, for example, to a current position of the navigation device or data on weather conditions, traffic conditions, or energy consumption along the route collected while traveling the route. For example, the current position of the navigation device may be used in the data cloud to adjust the data transmitted from the data cloud to the navigation device to that position. Data about weather conditions, traffic conditions, or energy consumption along the route collected while traveling the route can be made available in the data cloud to other users of the data cloud, for example.

In a route-related data exchange of this type between a navigation device and a data cloud, the actual user data (for example, data on weather or traffic conditions) relate to the route or a route section of the route. Therefore, data characterizing the route or route segment must also be transmitted with the payload data. In the case of frequent data exchange between the navigation device and the data cloud, this can lead to a considerable volume of data to be transmitted.

The invention is based on the task to enable an efficient exchange of route-related data between a navigation device and a data cloud.

According to the invention, the task is solved with a method for exchanging data between a navigation device and a data cloud for a route with the following steps:
  storing the route in the data cloud and in the navigation device,
  assigning a route identifier for the route in the data cloud,
  transmitting the route identifier from the data cloud to the navigation device, and
  transmitting additional data between the navigation device and the data cloud, each of which relates to a route section of the route and is transmitted together with the route identifier.

In the method according to the invention, a route is stored both in the data cloud and in the navigation device. This means that the route is known to both the data cloud and the navigation device. Furthermore, a route identifier is assigned for the route in the data cloud, which is transmitted from the data cloud to the navigation device. Thus, the route identifier is also known to both the data cloud and the navigation device. The route identifier uniquely identifies the route and distinguishes it from other routes. For example, the route identifier of a route is an identifier assigned to the route in the form of a sequence of digits and/or letters, whereby identifiers different from each other are assigned to different routes. In this way, a route can be uniquely identified on the basis of the identifier assigned to it. When additional data relating to a route section is exchanged between the navigation device and the data cloud, the route identifier is transmitted in each case with the additional data. In this way, the route can be assigned to the additional data on the basis of the route identifier only, without requiring the transmission of further data describing the route. This enables efficient route-related data exchange between a navigation device and a data cloud, in which the route can be referenced solely on the basis of its route identifier.

In one embodiment of the method according to the invention, the route sections of the route are described with relative position data related to a reference point on the route.

In other words, according to the aforementioned embodiment of the method according to the invention, the route segments are not described by absolute position data, which in each case describe a position geographically precisely, for example with reference to a specific coordinate system. Instead, the route sections are described by relative position data that relate the route sections in each case to a reference point on the route. For example, the reference point is the starting point of the route. For example, the relative position data provides a distance to travel from the reference point to a point on the route segment (for example, to the start or end point of the route segment) along the route. Further, the relative position data may indicate a length of the route section along the route, that is, a length of a path to be traveled from the starting point of the route section to an end point of the route section along the route. Since, according to the invention, the route is known to both the navigation device and the data cloud, such relative position data can uniquely characterize a route section without having to transmit absolute position data describing the route section in geographically precise terms. Such relative position data related to a route requires much less information than absolute position data of a route section and therefore advantageously further reduces the data to be transmitted between the navigation device and the data cloud.

In a further embodiment of the method according to the invention, the route is calculated with the navigation device and route data characterizing the route is generated with the navigation device and transferred to the data cloud.

The aforementioned embodiment of the method according to the invention is directed to an embodiment of the method in which the route is calculated with the navigation device. In this embodiment of the method according to the invention, route data characterizing the route is therefore generated with the navigation device and transferred to the data cloud. This data is then processed in the data cloud to store the route in the data cloud as well.

In another embodiment of the method according to the invention, the route is calculated in the data cloud and route data characterizing the route is generated in the data cloud and transmitted to the navigation device.

The aforementioned embodiment of the method according to the invention is directed to an embodiment of the method in which the route is calculated in the data cloud. In this embodiment of the method according to the invention, route data characterizing the route is therefore generated in the data cloud and transmitted to the navigation device. This data is subsequently processed in the navigation device to store the route in the navigation device as well.

In a further embodiment of the method according to the invention, additional data transmitted from the navigation device to the data cloud relate in each case to a route section covered. These additional data characterize, for example, weather conditions on the route section, traffic conditions on the route section, an energy consumption for covering the route section, a time duration for covering the route section, an actual length of the route section, a position of the route section on the route, a time of reaching the route section and/or a time of leaving the route section.

Such additional data related to covered route segments can be used advantageously, for example, to be processed in the data cloud and made available to other users of the data cloud, for example to inform these users about weather or traffic conditions. Furthermore, it can be used to adapt additional information transmitted from the data cloud to the navigation device to current circumstances (for example, weather or traffic conditions) that are relevant for covering the route.

In a further embodiment of the method according to the invention, additional data transmitted to the data cloud by the navigation device are stored in the data cloud and assigned to the route identifier.

The storage in the data cloud of additional data transmitted by the navigation device to the data cloud and their assignment to the route identifier, which is provided in accordance with the aforementioned embodiment of the method according to the invention, advantageously enables data stored in the data cloud relating to the route to be supplemented and/or updated.

In a further embodiment of the method according to the invention, additional data transmitted from the data cloud to the navigation device relate in each case to a route section to be covered and have a prediction of weather conditions on the route section, traffic conditions on the route section, an energy consumption for covering the route section, a time duration for covering the route section, a time of reaching the route section and/or a time of leaving the route section.

Such additional data related to route segments to be covered can be used advantageously, for example, to inform a user of the navigation device about expected traffic conditions, weather conditions and/or times, as well as expected energy consumption for covering route segments, or to update corresponding predictions in this regard.

In a further embodiment of the method according to the invention, additional data is transmitted from the data cloud to the navigation device only in response to a request sent by the navigation device to the data cloud. The request has, for example, the route identifier and characterizes a route section to which the request relates.

In other words, in this embodiment of the method according to the invention, additional data is sent from the data cloud to the navigation device only if the navigation device has previously sent a corresponding request to the data cloud. As a result, the data traffic between the navigation device and the data cloud can advantageously be further reduced to information relevant for the navigation device or a user of the navigation device. In that the request comprises the route identifier and characterizes a route section to which the request refers, the data traffic between the navigation device and the data cloud is advantageously further reduced, since the route is specified only by the indication of the route identifier (and not by further data describing, for example, points on the route) and the route section can be described by the above-mentioned relative position data.

In a further embodiment of the method according to the invention, in the event that a route identifier unknown to the data cloud is transmitted to the data cloud by the navigation device, an error message is sent to the navigation device by the data cloud.

In the aforementioned embodiment of the method according to the invention, the navigation device is thus informed by the error message that no route is known for the route identifier it uses in the data cloud. Thus, the navigation device is also informed that further correspondence with the data cloud regarding this route identifier is futile and can be discontinued. This also advantageously reduces the data traffic between the navigation device and the data cloud.

According to the invention, the task is further solved with a data exchange system for exchanging data between a navigation device and a data cloud concerning a route, which comprises:
- a storage service arranged for storing the route in the data cloud,
- a storage unit arranged for storing the route in the navigation device,
- an allocation unit arranged for allocating a route identifier for the route in the data cloud,
- a transmission service arranged for transmitting the route identifier and additional data, a transmission service arranged to transmit the route identifier and additional data relating to a route section of the route from the data cloud to the navigation device, and
- a transmission unit arranged to transmit additional data relating to a route section of the route together with the route identifier from the navigation device to the data cloud.

Such a data exchange system makes it possible to carry out the method according to the invention. Therefore, the advantages of such a data exchange system result from the above-mentioned advantages of the method according to the invention.

BRIEF DESCRIPTION OF DRAWINGS

Embodiments of the invention are explained in more detail below with reference to drawings. Thereby show.

DETAILED DESCRIPTION OF EXAMPLE EMBODIMENTS

Figure 1:
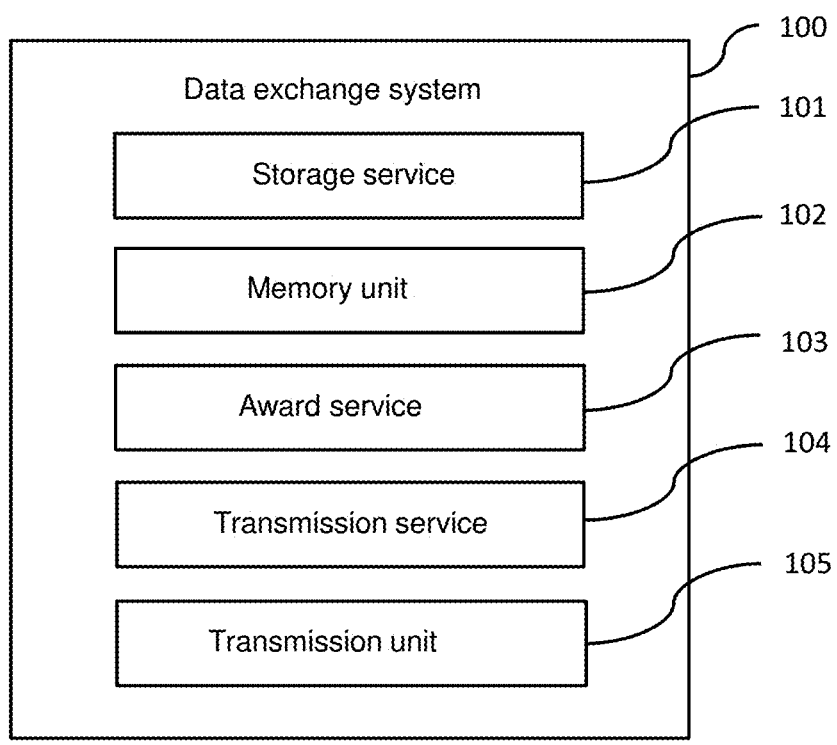
FIG. 1 is a block diagram of an embodiment of a data exchange system according to the invention.

FIG. 1 shows a block diagram of a data exchange system 100 for exchanging data between a navigation device and a data cloud regarding a route according to one embodiment of the invention. The navigation device 100 has the following functional units shown in FIG. 1: a storage service 101, a memory unit 102, an allocation service 103, a transmission service 104, and a transmission unit 105.

The storage service 101 is arranged to store the route in the data cloud. For this purpose, the storage service 101 stores data describing positions of points on the route and their order along the route. The storage service 101 is further arranged to store additional data about the route transmitted to the data cloud by the transmission unit 105.

The memory unit 102 is arranged to store the route in the navigation device. For this purpose, the memory unit 102 also stores data describing positions of points on the route and their order along the route. The storage unit 102 is further adapted to store additional data about the route transmitted to the navigation device by the transmission service 104.

The memory unit 102 has a non-volatile memory, which is, for example, an EEPROM (Electrically Erasable Programmable Read-Only Memory). Alternatively, the memory unit 102 may have another type of memory, such as a flash EEPROM or a hard disk. In particular, the memory unit 102 may have more than one of the aforementioned memories.

The allocation service 103 is arranged to allocate a route identifier for the route in the data cloud. For example, the assignment service 103 is arranged to assign a unique identifier in the form of a sequence of digits and/or letters to the route as a route identifier.

The transmission service 104 is arranged to transmit the route identifier and additional data related to a route section of the route from the data cloud to the navigation device. For example, the transmission service 104 is arranged to transmit the route identifier and additional data to the navigation device via a radio link, in particular a mobile radio link.

For example, additional data transmitted from the data cloud to the navigation device each relate to a route segment to be covered and include a prediction of weather conditions on the route segment, traffic conditions on the route segment, an energy consumption for covering the route segment, a time duration for covering the route segment, a time of reaching the route segment, and/or a time of leaving the route segment.

The transmission service 104 may further be configured to transmit additional data from the data cloud to the navigation device only in response to a request sent by the navigation device to the data cloud.

Further, the transmission service 104 may be arranged to send an error message to the navigation device in the event that a route identifier unknown to the data cloud is transmitted to the data cloud by the navigation device.

The transmission unit 105 is arranged to transmit additional data related to a route section of the route together with the route identifier from the navigation device into the data cloud. For example, the transmission unit 105 is arranged to transmit the additional data together with the route identifier into the data cloud via a radio connection, in particular a mobile radio connection.

For example, additional data transmitted from the navigation device to the data cloud each relate to a route segment traveled. This additional data characterizes, for example, weather conditions on the route section, traffic conditions on the route section, an energy consumption for covering the route section, a time duration for covering the route section, an actual length of the route section, a position of the route section on the route, a time of reaching the route section and/or a time of leaving the route section.

In this regard, the transmission service 104 and the transmission unit 105 are each arranged to describe a route portion of the route with relative position data related to a reference point on the route, such as a starting point of the route.

The storage service 101, the allocation service 103, and the transmission service 104 are each implemented by a computer program executed in the data cloud.

Figure 2:
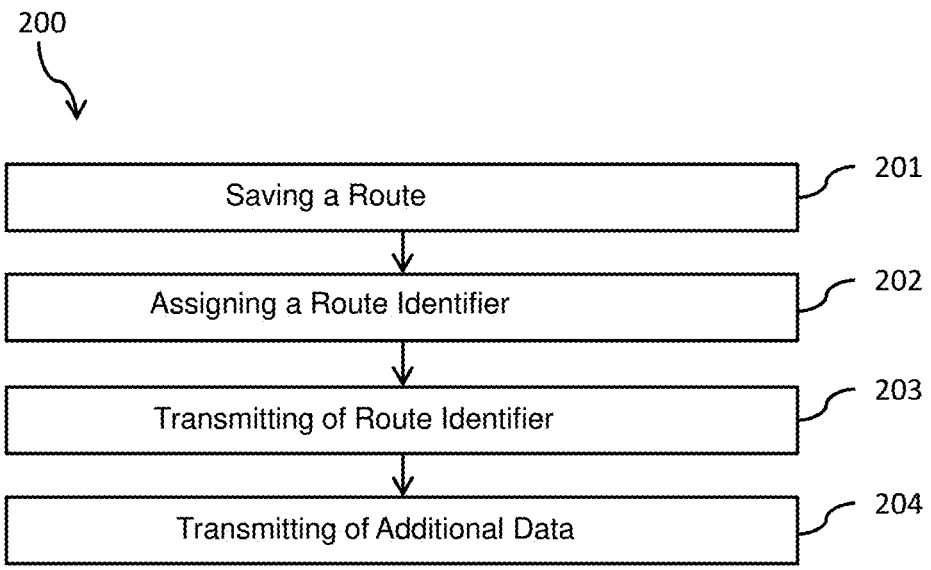
FIG. 2 is a flow chart of an embodiment of the process according to the invention.

FIG. 2 shows a flowchart 200 of a method comprising method steps 201 to 204 for exchanging data between a navigation device and a data cloud for a route according to one embodiment of the invention. The method is carried out using a data exchange system 100 described with reference to FIG. 1.

The process steps 201 to 204 are also described below with reference to FIG. 3.

Figure 3:
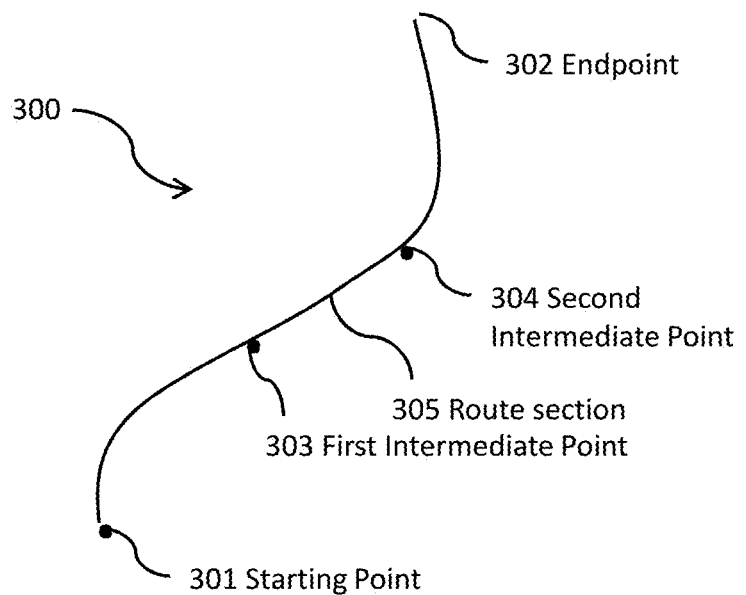
FIG. 3 is route with a route section.

FIG. 3 illustrates a route 300. the route 300 extends from a starting point 301 to an ending point 302. Also illustrated is a route section 305 of the route 300. the route section 305 extends from a first intermediate point 303 on the route 300 to a second intermediate point 304 on the route 300.

For example, the route 300 is calculated using the navigation device and route data characterizing the route 300 is generated using the navigation device and transmitted to the data cloud using the transmission unit 105.

Alternatively, the route 300 is calculated in the data cloud, for example, and route data characterizing the route 300 is generated in the data cloud and transmitted to the navigation device using the transmission service 104.

In a first method step 201, the route 300 is stored in the data cloud with the memory service 101 and in the navigation device with the memory unit 102. In this process, the memory service 101 and the memory unit 102 each store data describing positions of points 301 to 304 on the route 300 and their order along the route 300.

In a second method step 202, a route identifier that uniquely identifies the route 300 and distinguishes it from other routes is assigned by the assignment service 103 in the data cloud for the route 300. For example, a unique identifier in the form of a sequence of digits and/or letters is assigned to the route 300 as a route identifier.

In a third method step 203, the route identifier is transmitted from the data cloud to the navigation device using the transmission service 104.

In a fourth method step 204, additional data is transmitted between the navigation device and the data cloud, each of which is related to a route segment 305 of the route 300 and is transmitted together with the route identifier.

In this regard, the route section 305 is described using relative position data that is referenced to a reference point on the route 300. The reference point is, for example, the starting point 301 of the route 300. The relative position data indicates, for example, a distance to be covered along the route 300 from the reference point to a point on the route section 305, for example, to the first intermediate point 303 or the second intermediate point 304 in the case of the route 300 shown in FIG. 3. Alternatively, the relative position data indicates, for example, a length of time that has been or is expected to be required to travel the route 300 between the reference point and a point on the route section. Further, the relative position data may indicate a length of the route section 305 along the route 300, for example, in the case of the route 300 shown in FIG. 3, the length of the path from the first intermediate point 303 to the second intermediate point 304 along the route 300.

For example, additional data transmitted from the navigation device to the data cloud each relates to a route segment 305 traveled. This additional data is used to characterize, for example, weather conditions on the route segment 305, traffic conditions on the route segment 305, an energy consumption for traveling the route segment 305, a time duration for traveling the route segment 305, an actual length of the route segment 305, a position of the route segment 305 on the route 300, a time of reaching the route segment 305, and/or a time of leaving the route segment 305.

Additional data transferred to the data cloud by the navigation device is stored in the data cloud using the storage service 101 and associated with the route identifier.

For example, additional data transmitted from the data cloud to the navigation device each relates to a route segment 305 to be traveled and includes a prediction of weather conditions on the route segment 305, traffic conditions on the route segment 305, an energy consumption for traveling the route segment 305, a time duration for traveling the route segment 305, a time of reaching the route segment 305, and/or a time of leaving the route segment 305.

Additional data is transmitted from the data cloud to the navigation device, for example, only in response to a request sent by the navigation device to the data cloud. The request has the route identifier and characterizes a route section 305 to which the request refers.

In the event that a route identifier unknown to the data cloud is transferred to the data cloud by the navigation device, an error message is sent to the navigation device by the data cloud. The navigation device then registers a new route in the data cloud.

LIST OF REFERENCE NUMBERS

100 Data exchange system
101 Storage service
102 Memory unit
103 Award service
104 Transmission service
105 Transmission unit
200 Flowchart
201 to 204 Procedural step
300 Route
301 Starting point
302 Endpoint
303 First intermediate point
304 Second intermediate point
305 Route section

The invention claimed is:

1. A method of exchanging data between a navigation device and a data cloud on a route (300), comprising the steps of:
saving the route (300) in the data cloud and in the navigation device,
assigning, with an assignment service, a route identifier for the route (300) in the data cloud, the route identifier comprising a unique sequence of digits and/or letters,
transferring the route identifier from the data cloud to the navigation device,
transmitting additional data between the navigation device and the data cloud, the additional data is related to a route segment (305) of the route (300) and is transmitted along with the route identifier, and
controlling route-related data exchange between the navigation device and the data cloud solely on the basis of the route identifier, without requiring transmission of further data describing the route.

2. A method of exchanging data between a navigation device and a data cloud on a route (300), comprising the steps of:
saving the route (300) in the data cloud and in the navigation device,
assigning, with an assignment service, a route identifier for the route (300) in the data cloud,
transferring the route identifier from the data cloud to the navigation device,
transmitting additional data between the navigation device and the data cloud, the additional data is related to a route segment (305) of the route (300) and is transmitted along with the route identifier; and
controlling route-related data exchange between the navigation device and the data cloud solely on the basis of the route identifier, without requiring transmission of further data describing the route,
wherein the route sections (305) of the route (300) are described with relative position data related to a reference point on the route (300).

3. The method according to claim 1, wherein the route (300) is calculated with the navigation device and route data characterizing the route (300) are generated with the navigation device and transferred to the data cloud.

4. The method according to claim 1, wherein the route (300) is calculated in the data cloud and route data characterizing the route (300) are generated in the data cloud and transmitted to the navigation device.

5. The method according to claim 1, wherein the additional data transmitted from the navigation device to the data cloud each relates to a route segment (305) traveled and includes weather conditions on the route segment (305), traffic conditions on the route segment (305), an energy consumption for traveling the route segment (305), a time duration for traveling the route portion (305), an actual length of the route portion (305), a position of the route portion (305) on the route (300), a time of reaching the route portion (305), and/or a time of leaving the route portion (305).

6. The method according to claim 1, wherein the additional data transmitted from the navigation device to the data cloud are stored in the data cloud and associated with the route identifier.

7. The method according to claim 1, wherein the additional data transmitted from the data cloud to the navigation device each relates to a route section (305) to be travelled and comprises a prediction of weather conditions on the route section (305), traffic conditions on the route section (305), an energy consumption for covering the route section (305), a time duration for covering the route section (305), a time of reaching the route section (305) and/or a time of leaving the route section (305).

8. The method according to claim 1, wherein the additional data are transmitted from the data cloud to the navigation device only in response to a request sent by the navigation device to the data cloud.

9. The method of claim 8, wherein the request comprises the route identifier and characterizes a route segment (305) to which the request relates.

10. The method according to claim 1, wherein in case a route identifier unknown to the data cloud is transmitted to the data cloud by the navigation device, the method further comprises sending an error message to the navigation device by the data cloud.

* * * * *